Oct. 2, 1956

E. C. HUGHES ET AL 2,764,889

APPARATUS FOR DETERMINING THE BRITTLE
TEMPERATURE OF PLASTIC MATERIALS

Filed May 12, 1953

INVENTORS.
EVERETT C. HUGHES
HARLEY F. HARDMAN
MELVIN M. FINK
BY
Campbell, Brumbaugh, Free & Graves

ATTORNEYS

Oct. 2, 1956

E. C. HUGHES ET AL 2,764,889

APPARATUS FOR DETERMINING THE BRITTLE
TEMPERATURE OF PLASTIC MATERIALS

Filed May 12, 1953

INVENTORS.
EVERETT C. HUGHES
HARLEY F. HARDMAN
MELVIN M. FINK
BY Campbell, Brumbaugh, Free & Graves
ATTORNEYS

United States Patent Office 2,764,889
Patented Oct. 2, 1956

2,764,889

APPARATUS FOR DETERMINING THE BRITTLE TEMPERATURE OF PLASTIC MATERIALS

Everett C. Hughes, Shaker Heights, Harley F. Hardman, Lyndhurst, and Melvin M. Fink, Cleveland, Ohio, assignors to The Standard Oil Company, Cleveland, Ohio, a corporation of Ohio Application May 12, 1953, Serial No. 354,508

5 Claims. (Cl. 73—15.4)

The present invention relates to apparatus for determining the brittle temperature of plastic materials.

Many plastic materials such as asphalt, rubber and various synthetic resins are often used at sub-zero temperatures. Such applications have developed a real need for information relating to the properties of these plastic materials at the lower extremes of temperature. For example, asphalt is commonly used in road making and one of the essential requirements of this application is that the asphalt be capable of withstanding repeated flexing at any temperature which may normally be encountered. In order to be suitable for road making the asphalt therefore must not become brittle at low temperatures because, if it does, the road will quickly deteriorate. Because of requirements such as this, there has been developed a physical property measurement known as brittle temperature which is defined as the temperature at which a normally plastic material becomes brittle. Various types of apparatus have been designed for measuring brittle temperature but as yet, no really satisfactory apparatus for measuring the brittle temperature of all types of plastic materials has been developed.

It has previously been proposed to determine the brittle temperature of plastic materials by rotating a sample of the material through a liquid constant temperature bath against a fixed object which arrests the movement of the sample and causes it to break or to bend in passage through the bath. All of the test devices proposed in the prior art, however, have been designed specifically for the testing of one type of material and have had no adaptability to the testing of materials other than the specific one for which they were designed. In addition, the devices of the prior art have failed to sufficiently distinguish between two different samples of plastic material which have the same brittle temperature but which exhibit noticeably different strength and other characteristics at the brittle temperature. In other words, it does not necessarily follow that if two different samples of plastic material have the same brittle temperature, they are necessarily equivalent in their properties at that temperature, and the apparatus should also be capable of determining the differences that might exist at this temperature.

It is an object of this invention to provide an apparatus which is useful for measuring the brittle temperature of a wide variety of plastic materials.

It is another object of the invention to provide an apparatus which is capable of measuring not only the brittle temperature of a plastic material, but also the relative amounts of stress which the plastic material is capable of withstanding at the brittle temperature. Other objects will become apparent as the description of the invention proceeds.

The apparatus of this invention can best be illustrated by referring to the accompanying drawings in which.

Figure 1:
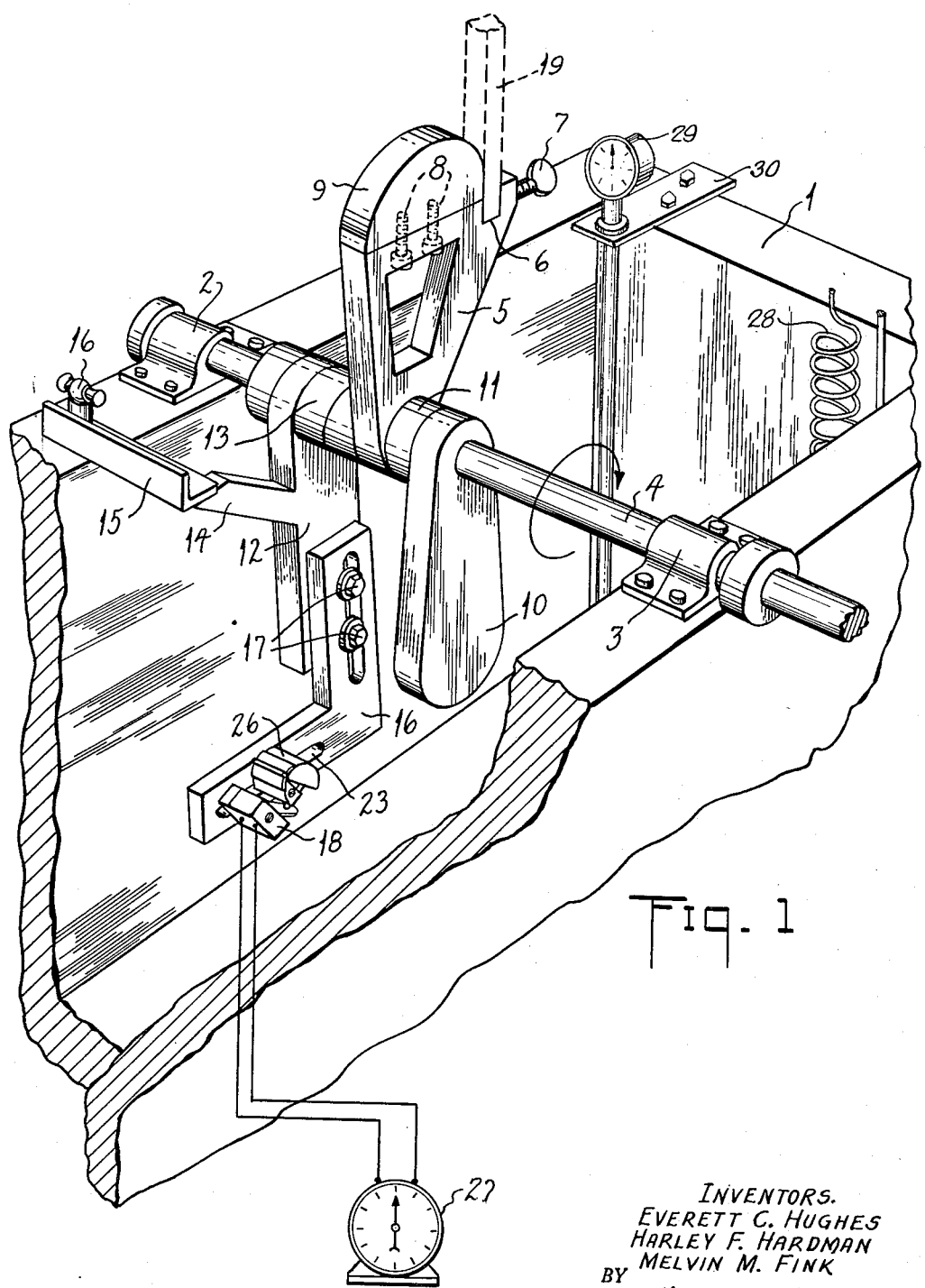
Figure 1 represents a view in perspective of the apparatus of this invention.

Referring specifically to Figure 1, 1 represents a vessel capable of holding liquid, hereinafter referred to as a constant temperature bath, and which is provided with refrigeration means and temperature controlling means (not shown). Mounted above the constant temperature bath by means of brackets 2 and 3 is shown a rotatable shaft 4 which is connected to a power source (not shown). Affixed to the shaft 4 in such a manner as to be rotatable therewith is a triangular arm 5 having a notch 6 for the insertion of a test sample and a thumb screw 7 adapted to engage the test sample 19 (shown in dotted lines) located in the notch 6. Affixed to the outer edge of the triangular arm 5 by means of screws 8 is a semi-circular quadrant 9.

Also mounted on the shaft 4 opposite the triangular arm 5 is a counterweight 10 which is likewise rotatable with the shaft. The counterweight 10 and the triangular arm 5 are spaced apart on the shaft by means of washer 11.

Also mounted on the shaft but in such a manner as to be not rotatable therewith is a pendant 12 which in normal position hangs downwardly into the constant temperature bath 1. The pendant 12 is also spaced apart on the shaft from the triangular arm 5 by means of washer 13. Extending laterally from the pendant 12 is a lever arm 14 which in normal operating position abuts against stop 15 which is attached in rigid position to the side wall of the constant temperature bath by means of bolt 16. Adjustably mounted on the lower portion of the pendant 12 by means of set screws 17 is an L-shaped arm 16, the lower leg of which extends in the same direction as lever arm 14. Mounted on the lower leg of the L-shaped arm 16 in a manner in which will be described later are a mandrel 26 and a microswitch 18.

Figure 2:
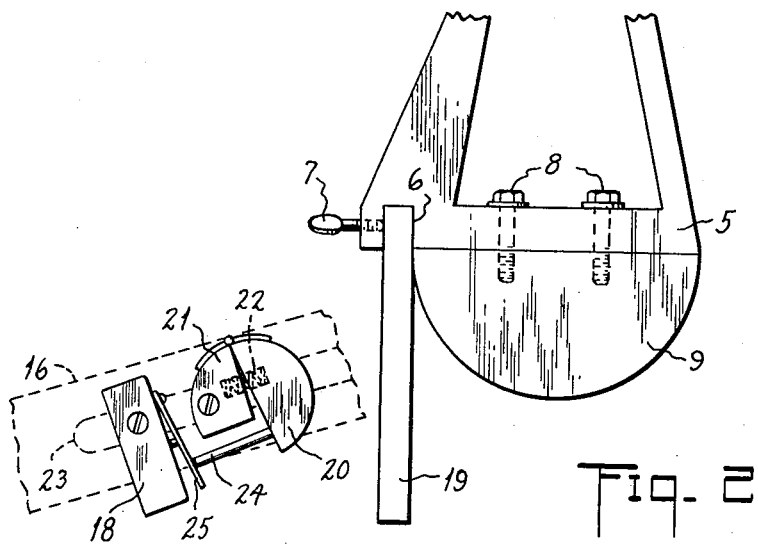
Figures 2 and 3 are enlargements of portions of the apparatus of Figure 1 which illustrate the operation of the apparatus in actual use.
Figure 3:
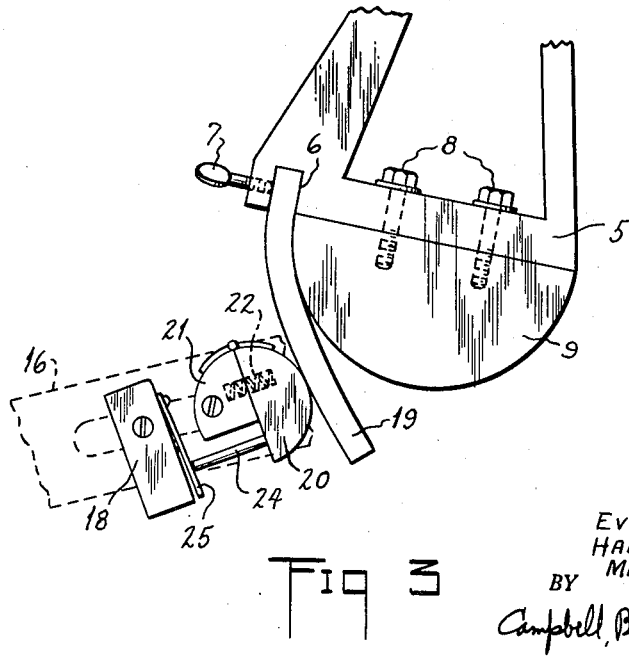

Referring now to Figures 2 and 3 there is presented an enlarged view of the mandrel 26 and the microswitch 18 illustrating the operation of these two mechanisms as they are actuated by pressure from the test sample 19 during rotation of the shaft 4.

As shown in Figure 2, the mandrel consists of a semi-cylindrical element 20 which is hinged to a quarter-cylindrical element 21 and held apart therefrom by means of coil spring 22. The element 21 is adjustably mounted on the lower leg of L-shaped arm 16 through slot 23 by means of a nut and bolt arrangement (not shown) while the semi-cylindrical element 20 is free to move about the hinge connecting it to the element 21.

Firmly welded to the semi-cylindrical element 20 is a prong 24 which in normal position lightly touches the contact arm 25 of the microswitch 18 which is mounted to the lower leg of the L-shaped arm 16 through slot 23 by a nut and bolt arrangement as in the case of element 21, and which is connected to an electric timer 27.

In Figure 3 a mandrel and microswitch are shown in a closed position as a result from pressure on the semi-cylindrical element 20 from a test sample 19.

The operation of the apparatus of this invention is as follows:

The constant temperature bath 1 is filled with a liquid, such as a glycol-water mixture, which has a low freezing point. The temperature of the liquid in the bath is then adjusted by means of a conventional refrigerating means which circulates a refrigerant through the coil 28 to a point approximating that of the brittle temperature of the sample of plastic material to be tested as indicated by the thermometer 29 held in position by the bracket 30. The test sample of the material to be tested is mounted in the notch 6 of the triangular arm 5 and the rotation of the shaft 4 is started. As the rotation of the shaft progresses, the test sample 19 becomes immersed in the constant temperature bath and eventually the sample contacts the semi-cylindrical element 20 of the mandrel 26. Since the movement of pendant 12 is arrested by stop 15, the mandrel arrests the movement of the test sample as shown in Figure 3 and, in order for the test sample to continue its travel in a circular direction, the sample must either bend or break. In either event, pressure will be applied on the mandrel which closes the microswitch, as explained hereinabove, thus starting the timing mechanism. As the travel of the test samples continues and it either breaks or bends, contact between the mandrel and the test sample will be broken allowing the microswitch to open through the influence of spring 22 and stopping the timer.

By obeservation of the sample when it rises to the position shown in Figure 1 after one revolution of the shaft, it is possible to ascertain whether the sample broke or merely bent in passing the mandrel. From the timing mechanism it is also possible to ascertain the exact time during which the test sample was in contact with the mandrel. The operation is repeated while changing the temperature of the bath until a temperature is reached at which about 50% of the samples will break.

The operation of the apparatus will now be described specifically as applied to the measurement of the brittle point of an asphalt.

Several sample bars, 1.25 x 1.25 x 11.5 cm. were molded by heating a sample of asphalt and casting the molten asphalt in brass molds. After the sample bars had hardened, they were placed in a wire mesh basket and the basket was immersed in the constant temperature bath at a temperature estimated to be slightly above the brittle temperature of the asphalt.

After all of the samples had been in the bath for a sufficient length of time to bring them to the temperature of the bath, i. e., about 15 minutes, one of the bars was removed from the basket, placed in the notch 6 and immediately immersed in the bath. Five minutes was allowed for the sample to regain the temperature of the bath. The rotation of the shaft was then started at a speed of about 0.486 R. P. M. thereby bringing the sample bar into contact with the semi-cylindrical element 20 of the mandrel. As the rotation of the shaft continued, it was noted that the sample did not break but instead merely bent in passing the mandrel. The time of contact between the mandrel and sample was also noted.

Thereafter the temperature of the bath was gradually lowered and sample bars were tested every 3 to 5° F. until a temperature was reached at which six samples were broken successively. This temperature was noted as the 100% break point. The bath temperature was then raised two degrees and another set of six samples was subjected to the test. The process was repeated until a temperature was reached at which none of six samples broke in passing the mandrel. This point was noted as the 0% break point.

It was noted in testing several batches of asphalt that the differences between the 0% break point and the 100% break point amounted to only a few degrees Fahrenheit, the average temperature difference between the 0% and 100% break points being about 8.4° F. Therefore, the brittle temperature of a given batch of asphalt was reported as the 50% break point which is approximately midway between the 0% and 100% break points. For the 0% breaks, the average time of contact between the sample bar and the mandrel was 0.15 minutes and for the 100% break point the average time of contact was 0.06 minutes.

In the manner described above, it is possible to measure not only the brittle temperature of a given asphalt, but also the time during which the asphalt samples were under stress. The time measurement is in itself an important factor because, although two different batches of asphalt may have the same brittle temperature, one of the asphalts may be capable of withstanding the same stress for a longer period of time before breaking, thereby affording an additional distinction between two batches of asphalt.

While the apparatus has been described specifically as applied to the determination of the brittle temperature of asphalt, it is obvious that the apparatus is also suitable for the determination of the brittle temperatures of other plastic materials such as rubber or various synthetic resins. Many modifications can be made in the apparatus to adapt it to the testing of different materials. For example, the speed of rotation of the shaft may be increased and/or the position of the mandrel may be changed by suitable adjustment of screw 17. In this manner, the mandrel may be made to contact a sample bar at any predetermined point, thereby varying the amount of stress which will be applied to the sample bar. In addition, the quadrant 9 may be replaced with another quadrant of different radius thereby changing the bending radius of the sample bar during tests in which the bar does not break. Other modifications will be apparent to those skilled in the art.

It is intended to cover all such changes and modifications which do not constitute departure from the spirit and scope of the appended claims.

We claim:

1. An apparatus for measuring the brittle temperature of a plastic material comprising a bath adapted to be maintained at a plurality of different constant temperatures, means for moving a sample of the material to be tested in a fixed path through said bath, a mandrel located in the path of said sample for contacting and bending said sample as it passes through said bath, and means cooperating with said mandrel for measuring the time of contact between the mandrel and the sample whereby the breaking of samples during the bending, together with the time intervals for said samples to break, furnish the basis for determining the brittle temperature and strength characteristics at said temperature.

2. Apparatus according to claim 1 in which the position of the mandrel is adjustable whereby the mandrel can be caused to contact the sample at any predetermined point.

3. Apparatus according to claim 1 in which the mandrel has two sections one of which is movable with respect to the other and the movement of which actuates the timing mechanism whereby contact between the sample and the movable section of said mandrel causes actuation of said timing mechanism.

4. An apparatus for measuring the brittle temperature of a plastic material comprising a constant temperature bath; means for adjusting the temperature of the bath to a predetermined and constant value; a rotatable shaft mounted above said bath; a rotatable arm attached to said shaft; a notch in said arm for holding a sample of the material to be tested; a clamp for securing the sample in said notch; a pendant supported by said shaft and hanging downwardly into the constant temperature bath; means for preventing said pendant from rotating; a mandrel and a microswitch adjustably mounted on said pendant, said mandrel being divided into two sections one of which is movable with respect to the other and the movement of which closes the microswitch; and an electric timer connected to said microswitch, whereby rotation of the shaft causes the sample to be brought into contact with the movable section of the mandrel thus bending the sample as it passes through the bath and closing the microswitch and actuating the electric timer whereby the breaking of samples during the bending, together with the time intervals for said samples to break, furnish the basis for determining the brittle temperature and strength characteristics at said temperature.

5. A subcombination adapted to be used in combination with a bath maintained at a plurality of different constant temperatures, comprising means for moving a sample of the material to be tested in a fixed path through said bath, a mandrel located in the path of said sample for contacting and bending said sample as it passes through said bath, and means cooperating with said mandrel for measuring the time of contact between the mandrel and the sample whereby the breaking of samples during the bending, together with the time intervals for said samples to break, furnish the basis for determining the brittle temperature and strength characteristics at said temperature.

References Cited in the file of this patent

UNITED STATES PATENTS

| | | |
|---|---|---|
| 2,185,340 | Howe | Jan. 2, 1940 |
| 2,528,918 | Stanius | Nov. 7, 1950 |
| 2,579,424 | Gehman | Dec. 18, 1951 |
| 2,611,264 | Keshian | Sept. 23, 1952 |
| 2,645,932 | MacLaren | July 21, 1953 |
| 2,670,624 | Farris et al. | Mar. 2, 1954 |